(12) United States Patent
Tweit et al.

(10) Patent No.: US 8,945,395 B2
(45) Date of Patent: Feb. 3, 2015

(54) SETTLING VESSEL AND METHOD OF USE

(75) Inventors: Travis Bjarne Tweit, Langdon (CA); Robert John Garnier, Sylvan Lake (CA)

(73) Assignee: Bonavista Energy Corporation, Calgary, AB, CA (US)

( * ) Notice: Subject to any disclaimer, the term of this patent is extended or adjusted under 35 U.S.C. 154(b) by 481 days.

(21) Appl. No.: 13/306,557

(22) Filed: Nov. 29, 2011

(65) Prior Publication Data

US 2013/0134109 A1    May 30, 2013

(51) Int. Cl.

| | |
|---|---|
| *B01D 21/02* | (2006.01) |
| *B01D 21/00* | (2006.01) |
| *E21B 21/06* | (2006.01) |
| *B01D 45/08* | (2006.01) |
| *B01D 21/24* | (2006.01) |
| *E21B 43/34* | (2006.01) |

(52) U.S. Cl.
CPC .......... *B01D 21/0042* (2013.01); *E21B 21/066* (2013.01); *B01D 45/08* (2013.01); *B01D 21/2483* (2013.01); *B01D 21/2405* (2013.01); *E21B 43/34* (2013.01)
USPC ... 210/747.1; 210/801; 210/803; 210/170.01; 210/519; 210/536; 210/540; 55/465; 95/272; 96/184; 166/75.12; 166/267

(58) Field of Classification Search
CPC .......... B01D 21/0042; B01D 21/2405; B01D 21/2444; B01D 21/2483; B01D 45/02; B01D 45/08; E21B 21/065; E21B 21/066; E21B 43/34
USPC ......... 210/747.1, 800, 801, 803, 170.01, 519, 210/521, 532.1, 533, 536, 538, 539, 540; 55/462, 465; 95/267, 272; 96/184; 166/75.12, 267
See application file for complete search history.

(56) References Cited

U.S. PATENT DOCUMENTS

| | | | | |
|---|---|---|---|---|
| 1,648,558 | A | * | 11/1927 | Meston et al. ................. 210/540 |
| 2,423,793 | A | * | 7/1947 | Olivo et al. .................... 210/535 |
| 2,610,697 | A | * | 9/1952 | Lovelady et al. ............. 210/801 |
| 4,042,512 | A | * | 8/1977 | McCarthy et al. ............ 210/519 |
| 4,247,312 | A | | 1/1981 | Thakur et al. |
| 4,539,023 | A | | 9/1985 | Boley |
| 4,617,031 | A | | 10/1986 | Suh et al. |
| 4,722,800 | A | | 2/1988 | Aymong |
| 5,149,344 | A | | 9/1992 | Macy |
| 5,415,776 | A | | 5/1995 | Homan |
| 5,865,992 | A | | 2/1999 | Edmondson |
| 5,900,137 | A | | 5/1999 | Homan |
| 5,919,284 | A | * | 7/1999 | Perry et al. ....................... 95/268 |
| 5,928,519 | A | | 7/1999 | Homan |

(Continued)

FOREIGN PATENT DOCUMENTS

| | | |
|---|---|---|
| CA | 2041479 | 10/1992 |
| CA | 2121831 | 10/1995 |

(Continued)

*Primary Examiner* — Christopher Upton
(74) *Attorney, Agent, or Firm* — Sheridan Ross P.C.

(57) ABSTRACT

A vessel for use in settling particulate matter from a fluid stream is provided. Fluid is introduced to the vessel through an angled inlet, with flow into the vessel both disrupted and deflected by an inlet baffle, to redirect the fluid stream parallel to a horizontal axis of the vessel. The velocity of the fluid stream is reduced within the vessel, allowing the particulate matter to settle along the bottom of the vessel.

47 Claims, 1 Drawing Sheet

(56) References Cited

U.S. PATENT DOCUMENTS

| | | |
|---|---|---|
| 6,419,730 B1 | 7/2002 | Chavez |
| 6,537,458 B1 * | 3/2003 | Polderman ................... 210/801 |
| 6,983,852 B2 | 1/2006 | Hemstock et al. |
| 7,278,543 B2 * | 10/2007 | Sagatun et al. ................. 96/184 |
| 7,383,958 B2 | 6/2008 | Hemstock et al. |
| 7,708,146 B2 | 5/2010 | Kruyer |
| 2003/0014951 A1 | 1/2003 | Crouse |
| 2008/0272059 A1 * | 11/2008 | Chieng et al. ................. 210/744 |

FOREIGN PATENT DOCUMENTS

| | | |
|---|---|---|
| CA | 2433741 | 10/2003 |
| CA | 2407554 | 4/2004 |
| CA | 2526233 | 4/2004 |
| CA | 2535215 | 4/2004 |
| CA | 2638550 | 5/2009 |

* cited by examiner

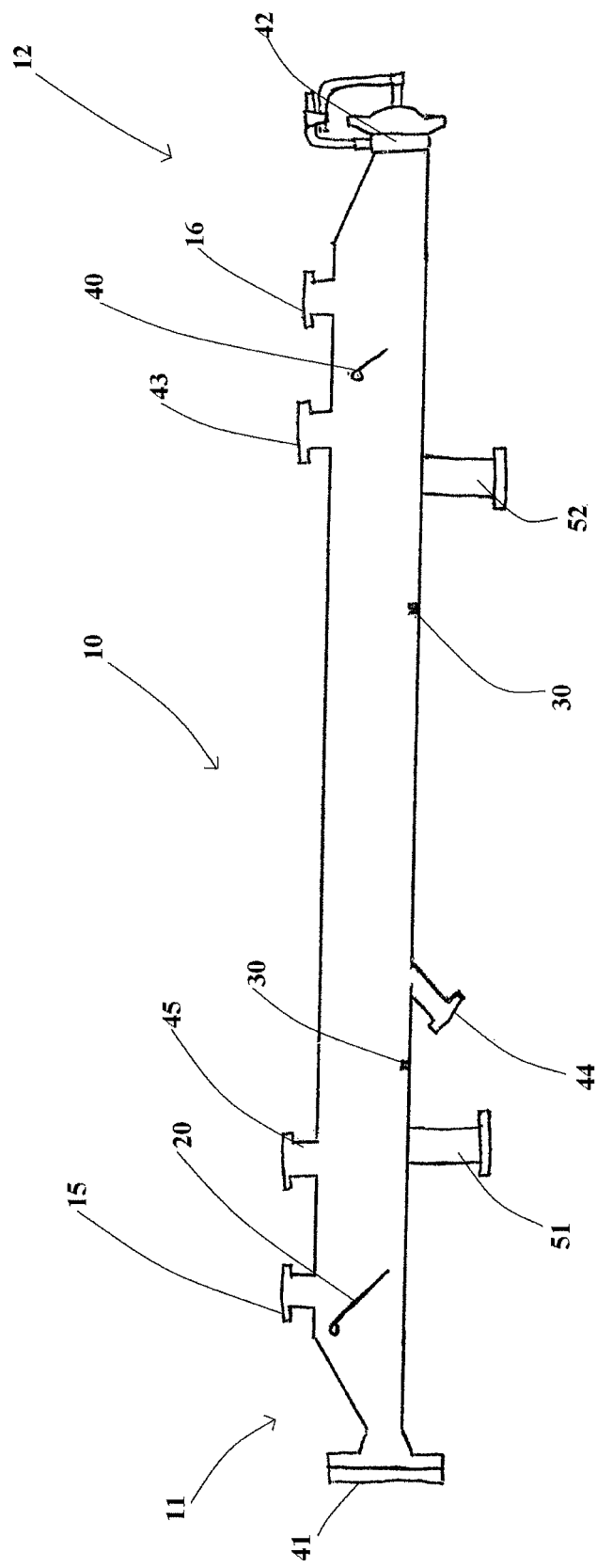

SETTLING VESSEL AND METHOD OF USE

FIELD OF THE INVENTION

The present invention relates generally to a vessel for use in removing particulate matter from a fluid stream. More particularly, the present invention relates to a horizontal desander having internal baffles, ribs, or flow barriers to assist in the removal of particulate matter from a fluid stream.

BACKGROUND OF THE INVENTION

In oil and gas operations, sand is often present within fluid streams removed from a wellbore. For example, sand may be used as a proppant in fracturing operations, and as a result, may be present in the resulting flow-back production fluid. Further, increasing amounts of sand may be produced as oil and gas field production matures. As the presence of sand within well fluids may damage or erode surface equipment, vessels of various configuration have been developed to assist in the removal of sand from fluids produced from a wellbore. Such vessels are typically known as desanders, or sand separators.

In a vertical sand trap, gravity is leveraged to effect settling of sand from the fluid flow. That is, a fluid stream enters a vertically oriented vessel, and sand accumulates in the bottom of the vessel for later removal.

In a hydrocyclone desander, one or more hydrocyclones are attached to a feed manifold. Inflow fluid to be desanded passes through the manifold and to the hydrocyclones, which discharge particulates from the bottom thereof, while overflow fluid from the hydrocyclone may be collected and further processed in subsequent steps.

SUMMARY OF THE INVENTION

In accordance with a first aspect of the invention, a vessel is provided for use in separation of particulate matter from a fluid stream, the vessel comprising; a horizontally elongated separation chamber comprising first and second ends, the chamber comprising walls defining a chamber volume; a chamber inlet and outlet, each providing an angular flowpath with respect to the elongated axis of the chamber, the inlet proximal to the first end of the chamber to define an inflow pathway for delivery of a fluid stream into the first end of the chamber, the outlet proximal to the second end of the chamber to define an fluid outflow pathway from the second end of the chamber, the chamber thereby providing a separation flowpath along the elongated axis of the chamber from the chamber inlet to the chamber outlet; one or more separation baffles depending from a bottom surface of the chamber between the inlet and the outlet to facilitate collection of particulate matter from the fluid stream along the bottom surface of the chamber; and an inlet baffle disposed within the chamber and aligned with the inflow pathway to disrupt flow of the fluid stream entering the separation chamber.

In an embodiment, the chamber is generally cylindrical and the inlet has a cross sectional area that is less than a corresponding cross sectional area of the elongated separation chamber.

In an embodiment, the vessel inlet and outlet are each oriented perpendicular to the horizontal axis of the vessel. The inlet baffle may be positioned at an angle to be aligned with both the inlet of the vessel and the elongated axis of the vessel, so as to redirect the fluid stream toward the outlet.

In certain applications, the fluid stream may originate from a wellhead, and may include oil, water, and/or gas. The fluid stream may comprise sand.

In an embodiment, at least one of the ends of the chamber comprises a valve for use in accessing the interior of the chamber to remove particulate matter therefrom. The vessel may further comprise a lower drain for use in washing and/or emptying the chamber.

In an embodiment, the vessel further comprises an outlet baffle within the chamber, the outlet baffle proximal to the outlet for disrupting flow of fluid from the inlet to the outlet. Generally, the inlet baffle and/or the outlet baffle may be positioned at an angle between 30 and 60 degrees from horizontal. For example, the inlet or outlet baffle may be positioned at 45 degrees from horizontal.

In an embodiment, the outlet extends from the side of the chamber, and the outlet baffle depends from an inner side wall of the chamber. The vessel may further comprise additional baffles extending from an inner side wall of the chamber.

In accordance with a second aspect of the invention, there is provided a vessel for use in separation of particulate matter from a fluid stream, the vessel comprising; an elongated, horizontal separation chamber comprising first and second ends and defining a chamber volume and having a cross sectional area; a chamber inlet and outlet, each providing an angled flowpath with respect to the elongated axis of the chamber, the inlet proximal to the first end of the chamber to define an inflow pathway for delivery of a fluid stream into the first end of the chamber, the outlet proximal to the second end of the chamber to define an fluid outflow pathway from the second end of the chamber, the chamber thereby providing a separation flowpath along the elongated axis of the chamber from the chamber inlet to the chamber outlet; an inlet baffle disposed within the chamber and aligned with the inflow pathway to disrupt flow of the fluid stream entering the separation chamber; and an outlet baffle within the chamber, the outlet baffle proximal to the outlet for disrupting flow of fluid from the inlet to the outlet.

In order to reduce the velocity of the fluid stream, the inlet may have a cross sectional area that is less than the cross sectional area of the chamber.

In an embodiment, the inlet baffle is positioned at an angle to be aligned with both the inlet of the vessel and the elongated axis of the vessel, so as to redirect the fluid stream toward the outlet.

In an embodiment, the inlet and outlet each provide a generally perpendicular flow pathway into or out of the vessel, respectively.

In an embodiment, the fluid stream originates from a wellhead and may comprise, oil, water, and/or gas. The fluid stream may comprise sand.

In an embodiment, at least one of the first and second ends of the chamber comprises a valve for use in accessing the interior of the chamber to remove particulate matter therefrom.

In an embodiment, the inlet baffle or the outlet baffle is positioned at an angle between 30 and 60 degrees from horizontal. For example, the inlet or outlet baffle may be positioned at 45 degrees from horizontal.

In an embodiment, the vessel further comprises a particulate outlet in a lower portion of the chamber.

In accordance with a third aspect of the invention, there is provided a method for use in settling particulate matter from a fluid stream, the method comprising the steps of: receiving a fluid stream from a fluid stream conduit, the fluid stream comprising fluid and particulate matter at a first pressure; introducing said fluid stream to a horizontally elongated vessel through a substantially vertically oriented inlet of the vessel, the horizontally elongated vessel further comprising a fluid outlet distal to the vertically oriented inlet of the vessel; operating the vessel contents at a second pressure, the second pressure lower than the first pressure to facilitate settling of particulate matter within the vessel; contacting the fluid stream with an inlet baffle, the baffle proximal to the inlet and oriented so as to redirect the vertical flow of the fluid stream from the inlet along the horizontal axis of the vessel; collecting fluid from the fluid outlet of the vessel; and collecting settled particulate matter from the vessel.

In various embodiments, the fluid stream may contain gas and/or liquid.

In an embodiment, the particulate matter is a proppant such as sand.

In an embodiment, the fluid stream comprises wellbore production fluid and the conduit may be a pipeline.

In an embodiment, the fluid outlet is oriented substantially parallel to the fluid inlet. In an embodiment, the fluid inlet and/or outlet comprises a substantially vertically oriented conduit extending from the vessel. The fluid outlet may discharge fluid vertically from the vessel.

In an embodiment, the step of operating the vessel contents at a second pressure comprises providing a vessel having a cross sectional area greater than the cross sectional area of the conduit from which the fluid stream is received.

In an embodiment, the step of contacting the fluid stream with an inlet baffle comprises installing the inlet baffle within the vessel proximal to, and aligned with, the inlet. The inlet baffle may be installed within the vessel at an angle between 30 and 60 degrees from horizontal.

In an embodiment, the step of removing settled particulate matter from the vessel comprises closing a valve to terminate fluid communication between the conduit and the vessel.

In an embodiment, the step of removing settled particulate matter from the vessel comprises opening a valve at an end of the vessel. The step of removing settled particulate matter from the vessel may comprise collecting particulate matter from a solids discharge port in the vessel.

In an embodiment, the method further comprises the step of contacting the horizontally redirected fluid stream with a separation baffle along a bottom surface of the vessel. In a further embodiment, the method comprised the step of contacting the horizontally redirected fluid stream within the vessel with an outlet baffle, the outlet baffle positioned within the vessel to interrupt flow of the fluid stream to the outlet.

In accordance with a fourth aspect of the invention, there is provided a method for separating particulate matter from a fluid stream, the method comprising the steps of: providing a separation vessel comprising: a horizontally elongated separation chamber, an inlet defining an inflow pathway substantially perpendicular to the elongated axis of the vessel, and a fluid outlet distal to the inlet, the outlet for discharging fluid from the vessel; introducing an inflow stream comprising fluid and particulate matter to the inlet; providing a baffle within the vessel, the baffle positioned within the inflow pathway and oriented to deflect a fluid stream from the inlet toward the outlet; providing one or more separation baffles extending from a bottom surface of the vessel, the baffle oriented substantially perpendicular to the elongated axis of the vessel; providing an outlet baffle within the vessel, the outlet baffle positioned so as to impede laminar flow of the fluid stream from the inlet to the outlet; discharging fluid from the outlet of the vessel; and removing settled particulate matter from the vessel.

In an embodiment, the step of removing settled particulate matter comprises opening a valve at one end of the vessel to access settled particulate matter within the vessel.

In an embodiment, the method further comprises the steps of connecting the inlet with a flow containment system continuous with a fluid stream. For example, the flow containment system may include a pipeline.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached FIGURES, wherein:

FIG. 1 is a schematic cross sectional view of a separator vessel in accordance with one embodiment of the invention.

DETAILED DESCRIPTION

Generally, a method and system for settling particulate matter from a fluid stream is provided.

In a horizontal sand trap, a fluid stream generally enters an area of reduced pressure, causing a decrease in fluid velocity. As a result, the particulate matter falls from the fluid and collects at the bottom of the sand trap. With reference to FIG. 1, a settling vessel 10 extends horizontally, defining two ends 11, 12. The vessel is constructed to be operated at pipeline pressures, for example up to 2800 psi.

Towards the first end 11 of the vessel, an inlet 15 is provided through which a fluid stream containing suspended particulate matter may be introduced. The inlet provides a generally perpendicular (substantially vertical) flowpath for the fluid stream into the vessel. Similarly, an outlet 16 is provided towards the second end 12 of the vessel, through which fluid may be discharged from the vessel. The outlet shown in the drawing provides a generally perpendicular (or substantially vertical) flowpath from the vessel.

Fluid streams containing gas, liquid and suspended particulate solid may all be introduced into the vessel inlet. For example, well production fluids may contain gas and liquid hydrocarbons, water, and sand. When such a fluid stream is introduced into the vessel, the sand is separated from the fluids and accumulates on the bottom of the vessel.

Inlet

The vessel inlet shown in FIG. 1 provides a conduit extending upwardly from the vessel. Extension from the top of the vessel in this manner may facilitate connection of the vessel within a facility or otherwise space-constrained system. However, the vessel inlet may instead simply be a port within the vessel, or may extend from the vessel from any location or at any angle. The fluid inlet may further be formed in the side of the vessel. The inlet is adapted for connection to the fluid stream source, using appropriate flanges, couplings, etc. When the vessel is used for desanding well production fluids, for example, the inlet would typically be connected to a pressurized pipeline or to pressurized surface production equipment. As such, the inlet would be adapted for fluid-tight connection to the fluid stream source. Typically, the conduit connected to the inlet will have a cross sectional area that is less than the cross sectional area of the vessel, thereby causing a pressure drop across the vessel inlet.

Fluid Outlet

With reference to FIG. 1, the vessel includes an outlet for discharge of fluid. The outlet shown in FIG. 1 extends vertically from the top of the vessel, however, many alternate outlet configurations are possible for discharge of fluid from the vessel. In most situations, an outlet location in the upper portion of the vessel would be suitable, to avoid resuspension of settled particulate matter from the bottom of the vessel as the fluid is discharged. However, a side outlet and baffle are also specifically contemplated, as this will again redirect the fluid stream, further interrupting laminar flow within the vessel to facilitate settling of any remaining particulate matter from the fluid stream prior to reaching the outlet. This configuration is further discussed below.

The outlet is adapted for connection to a tank, pipeline, conduit, or other fluid storage vessel. The outlet may contain a screen, baffle, or other flow obstructing device within the vertically extending portion of the outlet to promote settling of any sand that reaches the outlet.

Inlet Baffle

As the vertical introduction of fluid into a horizontal settling vessel would generally be expected to cause constant turbulence and erosion of the bottom surface of the vessel, a sacrificial inlet baffle 20 is provided, aligned with the inlet flowpath. The inlet baffle is positioned to redirect inflow fluid from the inlet towards the outlet. That is, the inlet baffle redirects inflow fluid parallel to the horizontal axis of the vessel and toward the second end 12 of the vessel. Should the inlet be provided in the side of the vessel instead of the top, the baffle would be appropriately positioned at an angle to direct fluid from the side inlet.

As shown in FIG. 1, the inlet baffle may be an angled plate provided within the vessel. Such baffle may be positioned within the vessel at an angle so as to be generally facing both the inlet flowpath and the horizontal axis of the vessel. The baffle should be removable, easily replaceable, and should not interfere with cleanout of particulate matter from the bottom of the vessel. For example, the baffle may be a tungsten plate hingedly attached to the vessel walls. The hinge mechanism of the baffle shown in FIG. 1 is provided as a bar welded at each end to the interior side sides of the vessel, the bar having a release and/or pivot point for accessing the bar to hingedly attach the baffle. The inlet baffle has generally flat upper and lower edges and therefore depends from the hinge bar leaving an upper gap between the upper edge of the baffle and the curved top of the vessel, while the lower edge of the inlet baffle rests along the lower portion of the curved walls of the vessel, leaving a lower gap between the lower edge of the baffle and the bottom of the vessel. The baffle is located and sized so as to rest at an angle of at least about 15 degrees from vertical. Practically, the angle is determined by the width of the inlet. That is, the baffle should be of a size and positioned at such an angle so as to provide a redirection barrier between the inlet and the bottom surface of the vessel. When appropriately positioned, the baffle redirects the inflow fluid stream along the horizontal axis of the vessel, while also acting as a sacrificial surface to prevent erosive damage to the bottom of the vessel opposite the inlet.

As the fluid stream enters the vessel at the inlet containing fluid and particulate matter, any streamlined or laminar flow in the fluid stream is interrupted by the inlet baffle. The turbulence introduced by placement of the baffle, together with the pressure drop across the inlet both serve to magnify the flow characteristics between the fluid and the particulate matter suspended therein, releasing the particulate matter from the fluid stream to settle at the bottom of the vessel.

Testing to date has confirmed that the turbulence provided at the first end of the vessel, by the positioning of the inlet and the inlet baffle as discussed above, causes a greater degree of settling towards the first end of the vessel that has been observed in existing horizontal settling devices without vertical introduction of the fluid stream and without an inlet baffle as described above.

In testing to date, the baffle has been placed at about a 45 degree angle from horizontal, however angles between 30 and 60 degrees would also be suitable. It is expected that an approximately equal angle from the inlet and from horizontal will be most efficient. That is, where the inlet is not vertical, the angle of the inlet should be appropriately adjusted. For example, angling the inlet at 45 degrees and the baffle at 45 degrees would result in the inflow stream contacting the baffle at 90 degrees. This may cause excessive turbulence, possibly resulting in backflow or excessive turbulence throughout the vessel.

The hinged attachment of the baffle facilitates cleaning out of particulate matter from the bottom of the vessel as needed, upon opening of the end valves of the vessel. The sacrificial inlet baffle may be inspected and replaced as necessary during regularly scheduled cleanout of the vessel to remove settled particulate matter. Notably, when the inlet is provided within the side of the vessel, cleanout of the particulate matter may be further facilitated as the inlet baffle could be positioned with a larger gap beneath the inlet baffle Providing a gap between the lower edge of the inlet baffle and the bottom of the vessel promotes settling towards the first end of the vessel, as the settled particulate matter can accumulate behind the inlet baffle. Testing to date has shown that the configuration of the inlet and inlet baffle shown in FIGURE provides more settling towards the inlet end of the tank, and therefore allows a greater time between particulate cleanouts than in existing vessels where the fluid stream is introduced parallel to the vessel axis without turbulence.

Secondary inlet baffles may also be present. These secondary baffles may extend within the vessel from any interior vessel surface, to disrupt flow of fluid through the vessel, thereby increasing fluid retention time and promoting settling. Notably, baffles extending inwardly from the sides of the vessel may be added without complicating cleanout procedures, particularly when such side baffles are hingedly attached and easily moved by cleaning equipment.

Settling Baffles

As redirected fluid flows from the inlet baffle 20 toward the second end 12 of the vessel, the fluid stream flows at reduced velocity such that particulate matter suspended within the fluid stream begins to fall toward the bottom of the vessel. The settling particulate matter may continue to be carried toward the second end of the vessel as it falls from suspension, by fluid flowing within the lower portion of the vessel. Placement of settling baffles along the bottom of the vessel may therefore be useful in halting the forward progression of such falling particulates, trapping them along the bottom of the vessel. An example of such settling baffles 30 is shown in FIG. 1.

Each settling baffle is configured as a rib extending across the width of the vessel between the inlet 15 and outlet 16. In the embodiment shown in the FIGURE, each rib is fixed to the bottom of the vessel and extends generally upward from the bottom of the vessel, but not to such an extent that would impede cleaning out of particulate matter from one or both ends of the vessel. In practice, a two-inch height has provided a suitable barrier for trapping particulate matter, while not impeding cleanout of the vessel. During operation, particulate matter will accumulate on the inlet side of each settling baffle, forming mounds that may be later remove from the vessel. As mounds of settled particulate accumulate along the bottom of the vessel, the mounds will further act as baffles to some extent, facilitating settling of further particulates from the redirected fluid stream. It is noted that the settling baffles may take any other suitable form, may be hingedly, pivotably, or removably attached within the vessel to facilitate cleanout, and may extend a significant distance across the vessel as desired.

Outlet Baffle

As a further aid to the settling of particulate matter from the fluid stream, an outlet baffle 40 may be placed within the vessel between the inlet and the outlet, proximal to the outlet. The outlet baffle is generally positioned so as to disrupt the flow of the fluid stream prior to reaching the outlet, facilitating the settling of further particulates from the fluid stream.

As shown in FIG. 1, an outlet is provided in the top of the vessel, extending vertically therefrom. The outlet may or may not also extend into the vessel. An outlet baffle 40 is positioned at an angle just before the outlet, to interrupt laminar flow along the horizontal axis of the vessel. Such redirection of the fluid stream promotes settling of any remaining particulate matter that may remain suspended within the fluid as it approaches the second end of the vessel.

The outlet baffle may be similar in construction, orientation, and installation as the inlet baffle, but will not be subject to erosive damage to the same extent as the inlet baffle due to the lower velocity and reduced concentration of particulate matter present in the fluid stream adjacent the outlet, compared to the concentration at the inlet. The outlet baffle may be fixed or hingedly attached within the vessel, may have generally flat upper and lower edges, and may rest at an angle, with the lower edge of the baffle supported by the lower portion of the vessel walls. This hinged attachment facilitates cleanout of the vessel, and also allows replacement of the outlet baffle as necessary. A gap above the upper edge of the baffle and below the lower edge of the baffle may be present. In addition, the outlet baffle may have slots, vertical weir openings, may be screened, or may be provided in any alternate configuration that partially or fully redirects, or partially obstructs flow to the outlet.

In an alternate configuration, the outlet may be provided in a first side of the vessel, proximal to the second end of the vessel, and one or more outlet baffles may also be attached to the first and/or second side of the vessel, just prior to the outlet. In this configuration, fluid would be required to flow around the outlet baffle(s) toward in order to reach the outlet.

Any additional lengthening of the pathway from the inlet to the outlet, or otherwise increasing the fluid retention time within the vessel, for example by placement of additional baffles, will favour further settling of particulate matter from the fluid stream.

Particulate Removal

During initial operation of the vessel, minimal particulate matter may be detected in the outlet fluid stream. As operation continues, and sand or other particulate matter accumulates along the bottom of the vessel, some particulate matter may be more readily detectable in the outlet fluid. Once the amount of particulate matter present in the outlet stream becomes unacceptable, the vessel will be taken off line for cleanout. In the embodiment shown in FIG. 1, each end of the vessel may be opened. One or both ends may be opened for cleaning out particulate matter from the vessel as needed.

As shown in FIG. 1, the vessel includes a vent 45, pressure release valve 43, lower drain 44. End valves 41, 42, are provided at each end of the vessel 11, 12, respectively. The pressure release valve 43, operates to release pressure from the vessel at a predetermined limit. For example, if the vessel is rated for 2800 psi, the pressure release valve 43 may open when an internal pressure of 2520 psi is detected (2800-10% tolerance).

When cleanout of particulate matter or other maintenance is required, the vent may be opened to depressurize the vessel. Once the vessel pressure has been equalized, one or both of the end valves 41, 42 may be opened to clean out particulate matter from the vessel as needed. A cleaning tool, for example a crush, scraper, or vacuum, is inserted into the open vessel and used to remove particulate matter, deflecting any baffles as necessary in order to access the bottom of the vessel for removal of solids.

A lower drain 44 is provided to facilitate full drainage of the vessel when relocation is desired.

Other Features

In FIG. 1, the vessel is supported within a front and rear saddle 51, 52. One or both of the saddles may be adjustable to accommodate support over various surfaces and structures, and to facilitate transport. In the embodiment shown, the front saddle 51 is fixed to the vessel, while the rear saddle 52 is movable beneath the vessel.

Operation

In operation, a fluid source/fluid stream containing particulate matter is identified. An inflow conduit continuous with the fluid source is attached to the vessel inlet 15. An outflow conduit may be attached to the outlet 16.

As the vessel is operated, receiving fluid from the fluid source via the inlet 15 proximal to the first end 11, the fluid stream entering the vessel will contact the inlet baffle at high velocity, causing turbulence in the fluid stream about the inlet. Fluid will be redirected generally parallel to the horizontal axis of the vessel, continuing to flow toward the second end 12 of the vessel. Solids within the fluid stream will be swept by the turbulent fluid, promoting separation of particulates from the fluid, and settling of same below and adjacent the inlet. Some particulates will be carried within the fluid toward the outlet, however as the cross sectional area of the vessel is greater than that of the inflow conduit, the velocity of the fluid slows and particulates are deposited along the bottom of the vessel, halted by the settling baffle(s) across the bottom of the vessel.

Compared with other pressurized horizontal settling vessels, a significant degree of settling occurs closer to the first end 11 (inlet end) of the vessel as a result of the presence of the inlet baffle, creating turbulence at the inlet. Moreover, as the inlet baffle redirects the fluid stream toward the second end 12 of the vessel, the first end of the vessel is available to collect settled solids behind the inlet baffle. This results in efficient utilization of the space within the vessel, and increases the amount of particulate matter collected within the vessel and/or the length of time between required cleanouts (before excessive particulates can be detected within the outlet fluid).

As necessary, the vessel may be taken off-line by closing the inlet (and outlet). The pressurized vessel is equalized to atmosphere via the vent 45, and one or both end valves 41, 42, may be opened for cleanout of settled particulate matter. When the vessel is to be moved, the interior may be washed and drained, and the vessel may be lifted from beneath, between the saddles.

During particulate cleanout, the baffles, and vessel surfaces in general, are inspected to determine appropriate timing for replacement based on erosion patterns experienced during operation. The baffles may be engineered to withstand erosion for at least the expected time required between cleanouts, such that no additional shutdowns of the vessel are required to maintain the baffles or other interior vessel surfaces.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A vessel for use in separation of particulate matter from a fluid stream, the vessel comprising;
   a horizontally elongated separation chamber comprising first and second ends, the chamber comprising walls defining a chamber volume;
   a chamber inlet and outlet, each providing an angular flowpath with respect to the elongated axis of the chamber, the inlet proximal to the first end of the chamber to define an inflow pathway for delivery of a fluid stream into the first end of the chamber, the outlet proximal to the second end of the chamber to define an fluid outflow pathway from the second end of the chamber, the chamber thereby providing a separation flowpath along the elongated axis of the chamber from the chamber inlet to the chamber outlet;
   one or more separation baffles depending from a bottom surface of the chamber between the inlet and the outlet to facilitate collection of particulate matter from the fluid stream along the bottom surface of the chamber; and
   an inlet baffle disposed within the chamber and aligned with the inflow pathway to disrupt flow of the fluid stream entering the separation chamber wherein the inlet baffle is positioned at an angle such that the surface of the baffle is aligned with both the inlet of the vessel and the downstream elongated axis of the vessel, so as to redirect the fluid stream toward the outlet.

2. The vessel as in claim 1, wherein the chamber is generally cylindrical and wherein the inlet has a cross sectional area that is less than a corresponding cross sectional area of the elongated separation chamber.

3. The vessel as in claim 1, wherein the inlet and outlet are each oriented perpendicular to the horizontal axis of the vessel.

4. The vessel as in claim 1, wherein the fluid stream originates from a wellhead.

5. The vessel as in claim 4, wherein the fluid stream comprises one or more fluids selected from the group consisting of: oil, water, and gas.

6. The vessel as in claim 1, wherein the fluid stream originates from a wellhead and the fluid stream comprises sand.

7. The vessel as in claim 1, wherein at least one of said first and second ends of the chamber comprises a valve for use in accessing the interior of the chamber to remove particulate matter therefrom.

8. The vessel as in claim 1, further comprising an outlet baffle within the chamber, the outlet baffle proximal to the outlet for disrupting flow of fluid from the inlet to the outlet.

9. The vessel as in claim 8, wherein the inlet baffle or the outlet baffle is positioned at an angle between 30 and 60 degrees from horizontal.

10. The vessel as in claim 9, wherein the inlet or outlet baffle is positioned at 45 degrees from horizontal.

11. The vessel as in claim 8, wherein the outlet baffle depends from an inner side wall of the chamber.

12. The vessel as in claim 11, further comprising additional baffles extending from an inner side wall to the chamber.

13. The vessel as in claim 1, further comprising a drain in a lower portion of the chamber.

14. The vessel as in claim 1, wherein the outlet extends from the side of the chamber.

15. A vessel for use in separation of particulate matter from a fluid stream, the vessel comprising;
   an elongated, horizontal separation chamber comprising first and second ends and defining a chamber volume and having a cross sectional area;
   a chamber inlet and outlet, each providing an angled flowpath with respect to the elongated axis of the chamber, the inlet proximal to the first end of the chamber to define an inflow pathway for delivery of a fluid stream into the first end of the chamber, the outlet proximal to the second end of the chamber to define an fluid outflow pathway from the second end of the chamber, the chamber thereby providing a separation flowpath along the elongated axis of the chamber from the chamber inlet to the chamber outlet;
   an inlet baffle disposed within the chamber and aligned with the inflow pathway to disrupt flow of the fluid stream entering the separation chamber wherein the inlet baffle is positioned at an angle such that the surface of the baffle is aligned with both the inlet of the vessel and the downstream elongated axis of the vessel, so as to redirect the fluid stream toward the outlet; and
   an outlet baffle within the chamber, the outlet baffle proximal to the outlet for disrupting flow of fluid from the inlet to the outlet.

16. The vessel as in claim 15, wherein the inlet has a cross sectional area that is less than the cross sectional area of the chamber.

17. The vessel as in claim 15, wherein the inlet and outlet each provide a generally perpendicular flow pathway into or out of the vessel.

18. The vessel as in claim 15, wherein the fluid stream originates from a wellhead.

19. The vessel as in claim 18, wherein the fluid stream comprises oil or gas.

20. The vessel as in claim 15, wherein the fluid stream originates from a wellhead and the fluid stream comprises sand.

21. The vessel as in claim 15, wherein at least one of said first and second ends of the chamber comprises a valve for use in accessing the interior of the chamber to remove particulate matter therefrom.

22. The vessel as in claim 15, wherein the inlet baffle or the outlet baffle is positioned at an angle between 30 and 60 degrees from horizontal.

23. The vessel as in claim 22, wherein the inlet or outlet baffle is positioned at 45 degrees from horizontal.

24. The vessel as in claim 15, further comprising a particulate outlet in a lower portion of the chamber.

25. A method for use in settling particulate matter from a fluid stream, the method comprising the steps of:
   receiving a fluid stream from a fluid stream conduit, the fluid stream comprising fluid and particulate matter at a first pressure;
   introducing said fluid stream to a horizontally elongated vessel through a substantially vertically oriented inlet of the vessel, the horizontally elongated vessel further comprising a fluid outlet distal to the vertically oriented inlet of the vessel;
   operating the vessel contents at a second pressure, the second pressure lower than the first pressure to facilitate settling of particulate matter within the vessel;
   contacting the fluid stream with an inlet baffle, the baffle proximal to the inlet and oriented so as to redirect the vertical flow of the fluid stream from the inlet along the horizontal axis of the vessel;

collecting fluid from the fluid outlet of the vessel;

collecting settled particulate matter from the vessel by releasing the pressure inside the vessel through the use of a pressure releasing valve; and by opening a valve proximate the inlet or by opening a valve proximate the outlet and removing said particulate matter.

26. The method as in claim 25, wherein the fluid stream comprises gas.

27. The method as in claim 25, wherein the fluid stream comprises a liquid.

28. The method as in claim 25, wherein the particulate matter is sand.

29. The method as in claim 25, wherein the particulate matter is proppant.

30. The method as in claim 25, wherein the fluid stream comprises wellbore production fluid.

31. The method as in claim 25, wherein the conduit is a pipeline.

32. The method as in claim 25, wherein the fluid outlet is oriented substantially parallel to the fluid inlet.

33. The method as in claim 25, wherein the fluid outlet discharges fluid vertically from the vessel.

34. The method as in claim 25, wherein the fluid inlet comprises a substantially vertically oriented conduit extending from the vessel.

35. The method as in claim 25, wherein the fluid outlet comprises a substantially vertically oriented conduit extending from the vessel.

36. The method as in claim 25, wherein the fluid is delivered to and collected from opposing horizontal ends of the vessel.

37. The method as in claim 25, wherein the step of operating the vessel contents at a second pressure comprises providing a vessel having a cross sectional area greater than the cross sectional area of the conduit from which the fluid stream is received.

38. The method as in claim 25, wherein the step of contacting the fluid stream with an inlet baffle comprises installing the inlet baffle within the vessel proximal to, and aligned with, the inlet.

39. The method as in claim 38, wherein the inlet baffle is installed within the vessel at an angle between 30 and 60 degrees from horizontal.

40. The method as in claim 25, wherein the step of removing settled particulate matter from the vessel comprises closing a valve to terminate fluid communication between the conduit and the vessel.

41. The method as in claim 25, wherein the step of removing settled particulate matter from the vessel comprises opening a valve at an end of the vessel.

42. The method as in claim 25, wherein the step of removing settled particulate matter from the vessel comprises collecting particulate matter from a solids discharge port in the vessel.

43. The method as in claim 25, further comprising the step of contacting the horizontally redirected fluid stream within the vessel with a separation baffle along a bottom surface of the vessel.

44. The method as in claim 25, further comprising the step of contacting the horizontally redirected fluid stream within the vessel with an outlet baffle, the outlet baffle positioned within the vessel to interrupt flow of the fluid stream to the outlet.

45. A method for separating particulate matter from a fluid stream, the method comprising the steps of:

providing a separation vessel comprising: a horizontally elongated separation chamber, an inlet defining an inflow pathway substantially perpendicular to the elongated axis of the vessel, and a fluid outlet distal to the inlet, the outlet for discharging fluid from the vessel;

introducing an inflow stream comprising fluid and particulate matter to the inlet;

providing a baffle within the vessel, the baffle positioned within the inflow pathway and oriented to deflect a fluid stream from the inlet toward the outlet;

providing one or more separation baffles extending from a bottom surface of the vessel, the baffle oriented substantially perpendicular to the elongated axis of the vessel;

providing an outlet baffle within the vessel, the outlet baffle positioned so as to impede laminar flow of the fluid stream from the inlet to the outlet;

discharging fluid from the outlet of the vessel;

removing settled particulate matter from the vessel by releasing the pressure inside the vessel through the use of a pressure releasing valve; and by opening a valve proximate the inlet or by opening a valve proximate the outlet and removing said particulate matter.

46. The method as in claim 45, wherein the step of removing settled particulate matter comprises opening a valve at one end of the vessel to access settled particulate matter within the vessel.

47. The method as in claim 45, further comprising the steps of connecting the inlet with a pipeline system continuous with a fluid stream.

* * * * *